No. 767,569. PATENTED AUG. 16, 1904.
J. M. W. KITCHEN.
MEANS FOR REGULATING COMBUSTION.
APPLICATION FILED MAY 14, 1902.
NO MODEL. 5 SHEETS—SHEET 1.
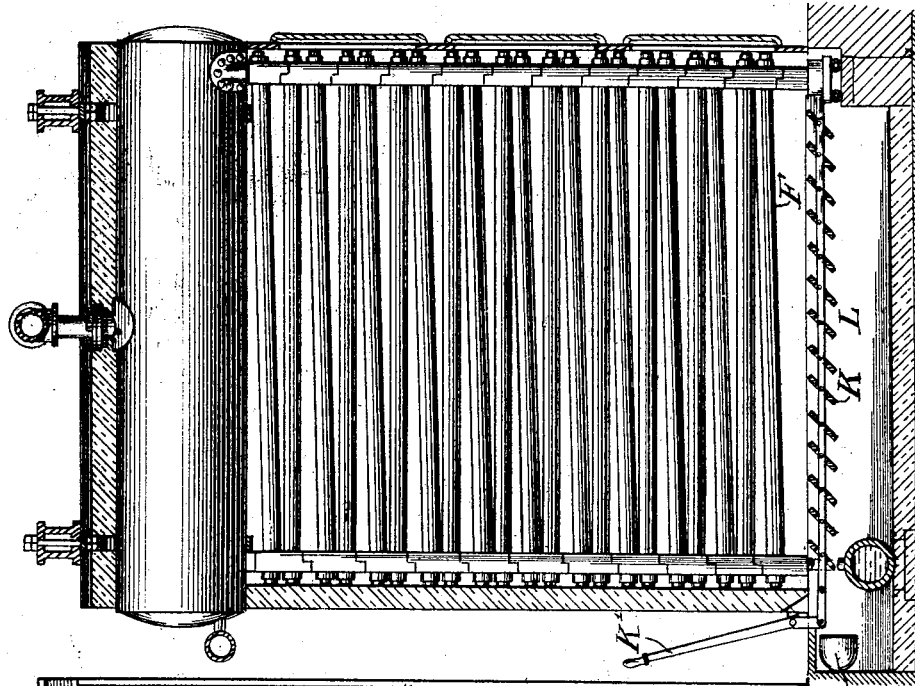
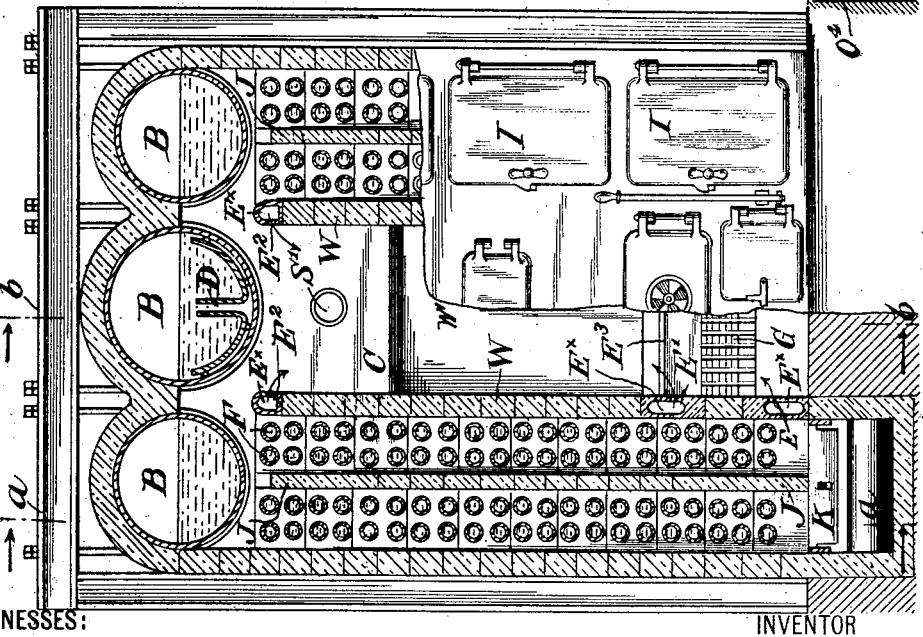

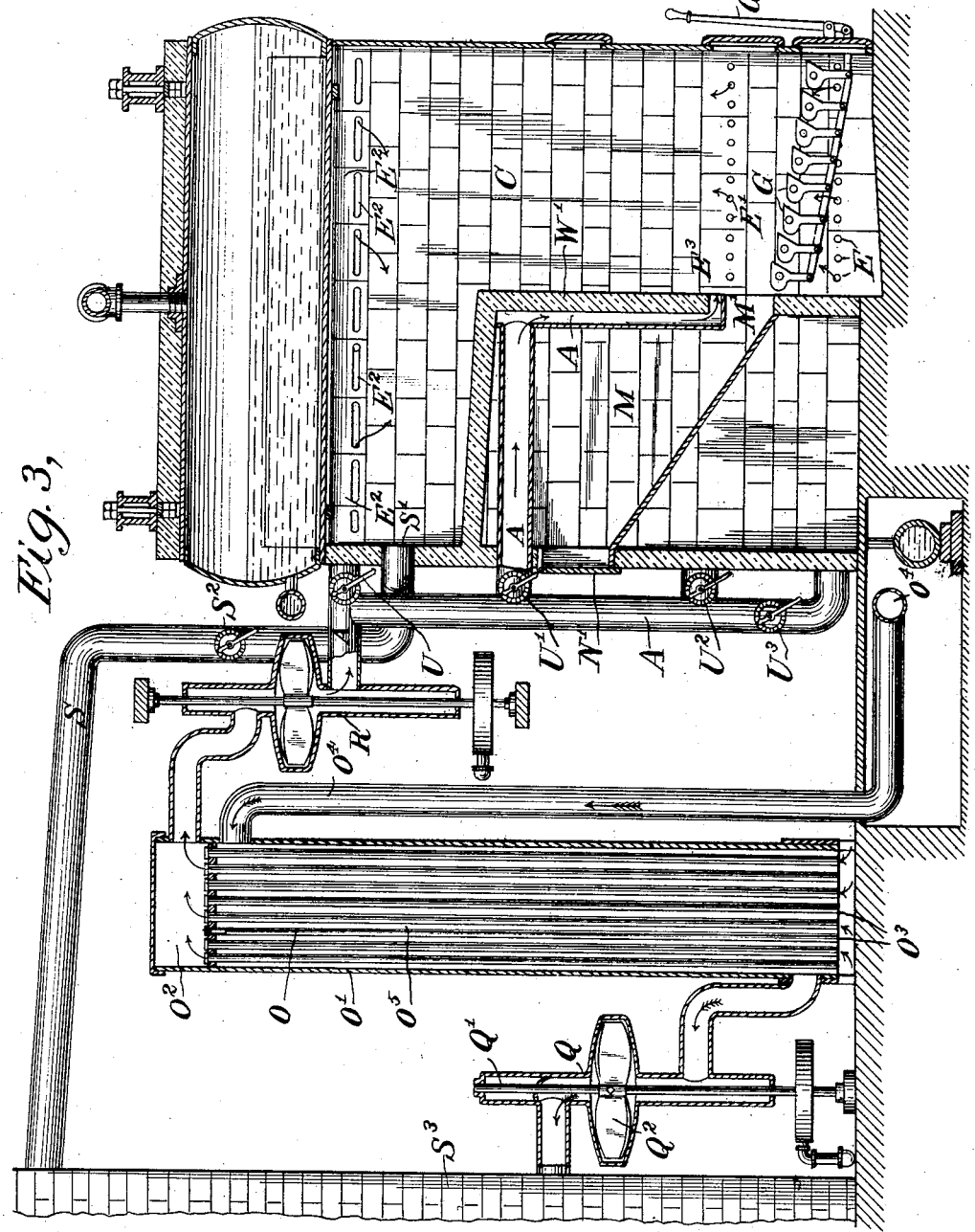

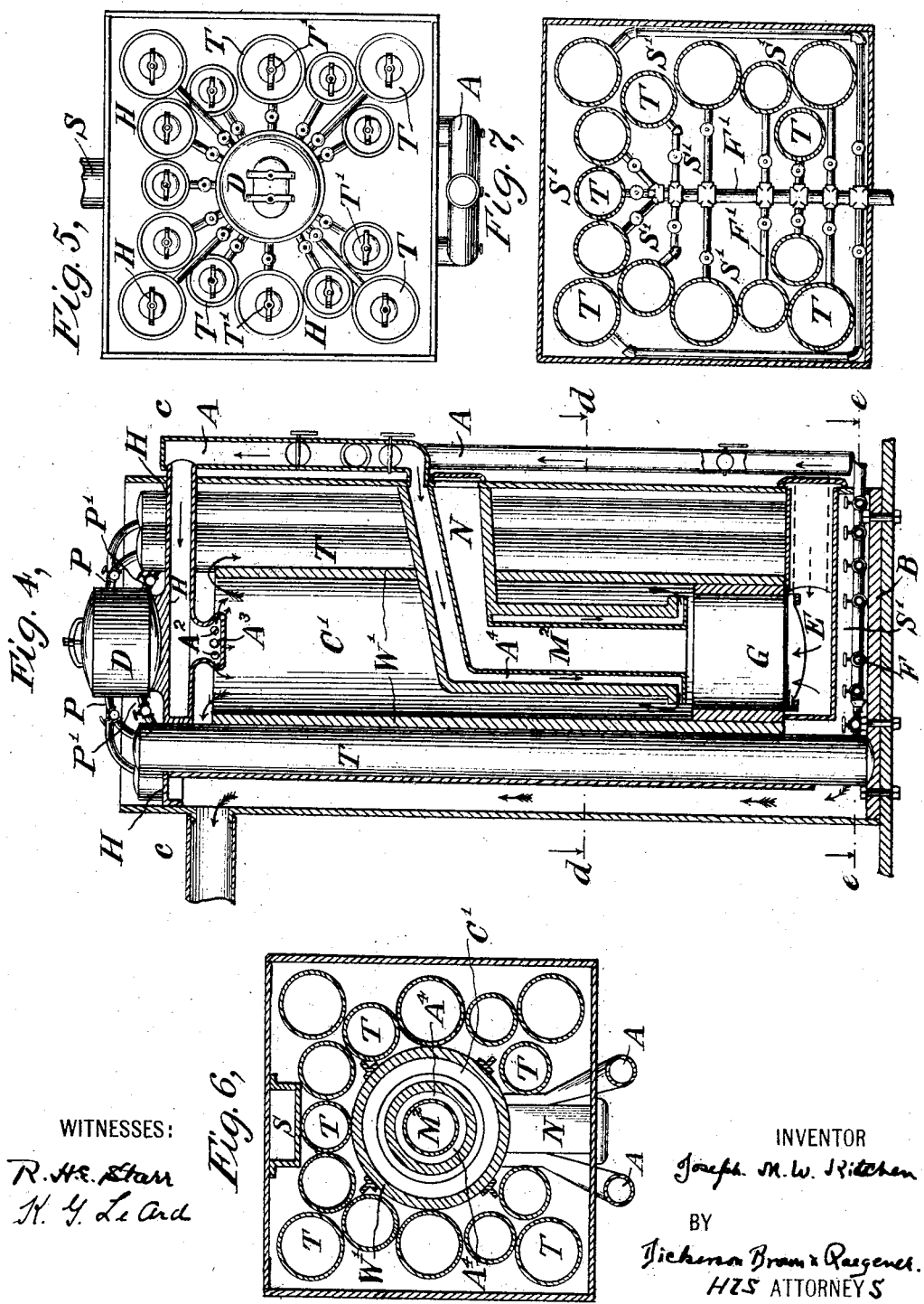

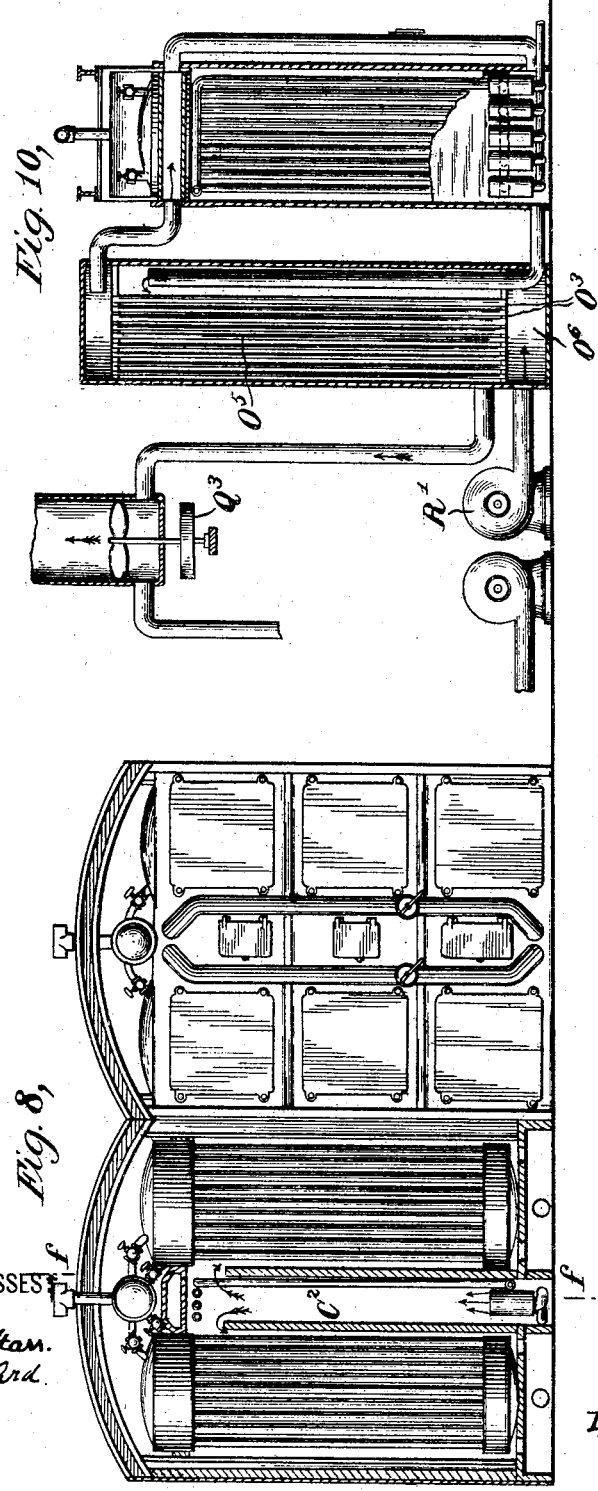

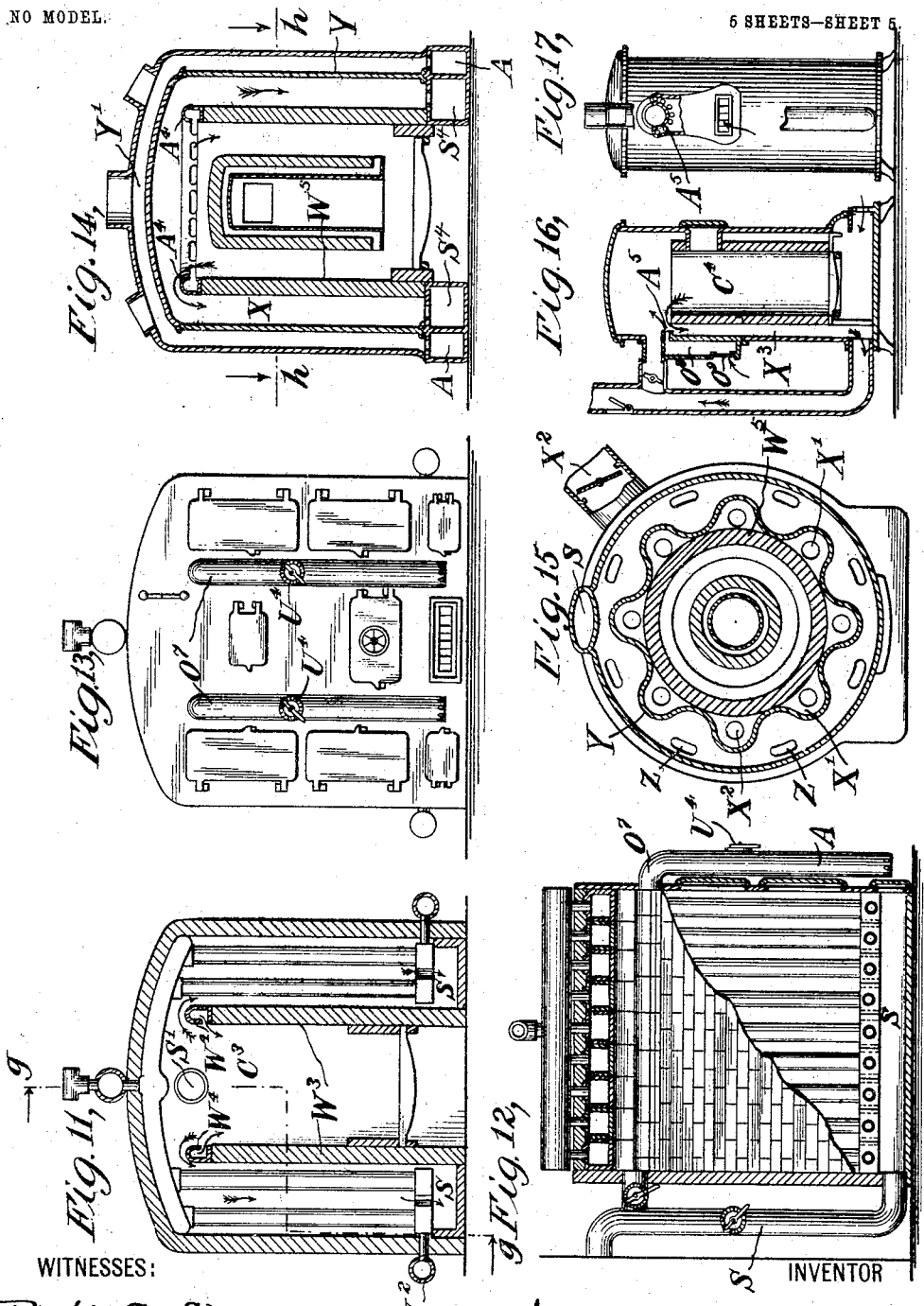

No. 767,569.　　　　　　　　　　　　　　　　　　　　　　　　Patented August 16, 1904.

UNITED STATES PATENT OFFICE.

JOSEPH M. W. KITCHEN, OF EAST ORANGE, NEW JERSEY.

MEANS FOR REGULATING COMBUSTION.

SPECIFICATION forming part of Letters Patent No. 767,569, dated August 16, 1904.

Application filed May 14, 1902. Serial No. 107,294. (No model.)

*To all whom it may concern:*

Be it known that I, JOSEPH M. W. KITCHEN, a citizen of the United States, residing in the city of East Orange, county of Essex, and State of New Jersey, have invented certain new and useful Improvements in Means for Regulating Combustion, of which the following is a full, clear, and exact description.

My invention relates to the regulation of combustion processes in heating and power-producing apparatuses. I will describe several apparatuses embodying my invention.

In the accompanying drawings, Figure 1 represents a front view of a high-pressure steam-boiler embodying my invention, partly in section. Fig. 2 represents a side vertical section on the line of $a\,a$, Fig. 1. Fig. 3 represents the same boiler with a vertical section through the line $b\,b$. Fig. 4 represents a vertical section of an upright marine boiler specially designed for securing economy of space in freight vessels. Fig. 5 represents a cross horizontal section of the same through the line $c\,c$. Fig. 6 represents a cross vertical section of the same through the line $d\,d$. Fig. 7 represents a horizontal section through the line $e\,e$. Fig. 8 represents a part of a marine-boiler battery designed for vessels having small vertical space in the hold and having low decks. This is in part section and is designed to burn oil as a fuel, the same being stored in tanks below the boiler-line and forced by air-pressure through vaporizing-pipes in the upper part of the combustion-chamber, thus producing the gas burned. Fig. 9 is a horizontal bed-plate section of the part of the battery shown in Fig. 8. Fig. 10 is a vertical side section of the boiler shown in Fig. 8 and made through the line $f\,f$. Fig. 11 represents a cross vertical section of a hot-water heating-boiler. Fig. 12 is a side vertical section, partly in elevation and partly in vertical section, of the same, taken through the line $g\,g$ of Fig. 11. Fig. 13 is a front elevational view of the boiler shown in Fig. 11. Fig. 14 is a vertical sectional view of a hot-air heater. Fig. 15 is a cross horizontal section of the heater shown in Fig. 14, taken through the line $h\,h$. Fig. 16 represents a simple heating-stove embodying my invention, showing a side vertical section. Fig. 17 is a partial elevational view of the rear of the same. In all these forms the generic elements of my invention are embodied. I will now describe the particular form illustrated in Figs. 1, 2, and 3.

In all the forms similar letters of reference indicate similar parts.

Referring now to Fig 1, it will be seen that the boiler consists of a central combustion-chamber C of large vertical extension having a mechanically-shaking and fuel-moving grate G (see Fig. 3) in its lower front part and a gravity fuel-magazine M, which has a feed-door N' and a discharging-orifice M', which discharges the fuel upon the rear end of the grate G, from which it is moved forward by the action of the grate G and the lever G'. As the fuel discharges from the orifice M' it is gradually coked and the gases, which are volatilized from it, are mixed with air for combustion— that is, forced or drawn through the air-duct A, the air following the line of the plain arrows there shown. Air for combustion is also introduced in jets through orifices E underneath the grate, through orifices E' in jets just above the grate, and in films through slots $E^2$ in the upper part of the combustion-chamber, in all casse the plain arrows indicating the entrance of air for combustion.

The orifices in the walls of the combustion-chamber are contracted to a size less than that of the air-ducts leading to them, so as to secure a penetrating action into the gases in the combustion-chamber of air forced through the orifices and a sudden expansion of the introduced air after the entrance of the air into the combustion-chamber.

It will be noticed that the combustion-chamber is of exceptional height as well as of large size. The object of this is to secure a long run for the combustible gases and flame before they impinge upon any heat-transmitting surfaces which would absorb heat from the burning gases before they were completely consumed. This provision secures the greatest production of heat from the fuel and also prevents injury to the apparatus by the contact of too intense heat at any single point. A further object is to secure a larger area for the admixture of air for combustion and the volatilized gases and to secure time for their admixture and combustion before they come in contact with heat-transmitting surfaces.

In my invention I do not confine myself to the introduction of air for combustion at any particular level of the apparatus. The levels of air introduction are varied to meet particular indications, and the amount of air introduced at any level is controlled by separate air-ducts having valves or dampers. The amount of air introduced at any level will depend on the purpose to be effected, and the nature of the air-orifices are adapted to form the currents that will best effect the purpose as well as to regulate the intensity or diffused nature of the currents. In some instances where the heat of the burning fuel is very intense low down in the apparatus, as may be the case where highly-heated gas is the fuel used or where injected fine coal-dust is used or even where a highly-forced draft is driven through a mass of ordinary fuel, it may be desirable to admit only a limited amount of air above and close to the fuel mass and with as little force as to restrict the action of the air thus introduced to the circumferential part of the fuel mass and to allow the air to rise vertically between the flame and volatilized hot gases and the walls of the combustion-chamber, thus helping to prevent destructive action to the walls of the chamber by securing a more gradual union of the gases and a diffusion of the heat as the air and gases rise through the higher run of the combustion-chamber, a final provision for complete union being a forced projection of air at higher levels. The orifices for air introduction are usually located on opposing sides of the combustion-chamber, so that forcibly-introduced air-currents will be carried entirely across the horizontal sectional areas of the combustion-chamber, and combustible rising gases will have to pass through the air-currents.

At the top of Fig. 1 are three shell-boilers B B B, furnishing large steam-emitting surfaces and which are exposed to the heat in their under surfaces, but which are covered with non-conducting material on their upper surfaces. These boilers may or may not have circulation-deflectors in them. I have shown such a deflector by the character D. On each side of this combustion-chamber and at the rear and in front are non-conducting walls W W' of fire-brick. Built in these walls are air-conductors $E^x$. On either side of the combustion-chamber are heat-absorbing cavities filled with piping F. The feed-water for the boilers is introduced into the piping at the bottom of these cavities and is progressively forced upward through the piping and into the shell-boilers, being progressively heated from below upward. These pipes are internally cleansible through hand-holes in their ends which are reached through the doors I I. Midway between the stack of pipes are movable plaques J J of tile or other material, by which the exterior of the piping can be reached and cleaned. The bottom of these cavities is more or less closed by adjustable shutters K, operated by the lever K'. (See Fig. 2.)

S' represents an outlet into the smoke-flue S, which is controlled by the damper $S^2$. (See Fig. 3.) This direct outlet is used in starting a fire. After the fire is started the damper $S^2$ (see Fig. 3) is closed and then the course of the hot gases is as follows: They rise under the influence of natural force immediately to the highest transmitting-surfaces of the apparatus, which in this case is the lower curvatures of the shell-boilers B B B. From here, under the influence of the draft, they are gradually drawn downward through the lateral heating-cavities and finally pass through the openings of the shutter-screen K into a smoke-cavity L. The object of the shutter-screen K is when it is almost closed to secure a uniform stratification of the gases at the bottom of the heating-cavity and also when fully open to allow any dust or soot accumulating in the cavities to drop into the cavity L, from whence it can be removed.

O (see Fig. 3) represents a heat abstractor or intercepter. It is composed of a casing O', the air-chamber $O^2$, and vertical heating-tubes $O^3$, which pass through the heating-chamber $O^5$, inclosed by the casing, and into which chamber at its top is discharged exhaust-steam and exhaust-gases of combustion from the cavity L and which are conveyed to the chamber of the abstractor O by way of the conduit $O^4$.

It will be noted that in the various figures those arrows which are feathered represent the currents of combined and exhaust gaseous products of combustion. Connected with the bottom of the heating-chamber $O^5$ is an exhaust-blower Q, having a long vertical shaft Q' and a fan $Q^2$ in an enlarged fan-box. This blower-fan can be revolved by a steam-turbine or by other means. This mechanism produces an induced draft through the combustion-chamber C, the heat-abstractor O, and the various communicating cavities and conduits and discharges the gaseous products of combustion into the chimney $S^3$. The blower has the elongated shaft and annular casing around the shaft, with bearings either high above the line of the hot gaseous currents or below it in order to prevent overheating of the bearings by the hot gases. The hot-gas-conducting flue connecting with the annular casing above the fan-box $Q^2$ is at a sufficiently low level to allow a non-conducting body of gas in the upper part of the annular casing to prevent too great heating of the upper bearing of the shaft Q'. The lower end of the shaft is so disposed as to allow of a ball and oil-immersion bearing at that point free from excessive heat. A substantially similar blower R is connected with the air-chamber $O^2$ and draws unvitiated pure air through the tubes O³, which are open at the bottom, and then forces it through the various conduits A A A, which communicate with the air-orifices E, E', E², and E³. By uniting the action of mechanically-produced induction and of forced draft objections which have previously existed to the use of either draft singly are overcome. In operating this boiler the blower Q is run at a rate which will induce a partial vacuum in the combustion-chamber C, while the blower R is run at a rate which will force air for combustion through the orifices E, E', E², and E³ in jets and films, thereby securing a thorough admixture and diffusion of the air of combustion with the volatilized gases from the fuel. These orifices are of a total area less than is the area of the discharge-flue from the combustion-chamber, which is to provide for a quick and widespread expansion of the compressed air forcibly introduced and yet not require a too quick exhaust of the hot gases from the apparatus after their combustion. The dampers U, U', U², and U³ provide for controlling the amount of air for combustion introduced at various levels and at various points in the apparatus. They are furnished with handles, indicating-dials, and retaining means for indicating the internal position of the dampers and for retaining them in any desired position. The air for combustion, which is admitted through the air-conduit by the damper U', is conveyed to an interspace between the fuel-magazine M and the non-conducting wall W'. This non-conducting wall W' and the interposed air prevents the coal in the magazine M from being caked and clogged from heat, and this facilitates its free discharge through the orifice M'. It will be noted that the air for combustion in this apparatus is conducted through what is substantially a dependent conduit, such as I have described and claimed in previous applications. In this case the conduit is subdivided and is combined with means for heating the air for combustion; but in this case also the products of combustion are prevented from finding exit from the open ends of the subdivided dependent conduit through the force of atmospheric pressure acting upwardly in said conduit, and the conduit is carried down below the grate-line of the boiler-valves for this special purpose. It is obvious that the heat-abstractor may be elongated to any desirable extent in order to secure sufficient atmospheric pressure to prevent the exit of products of combustion and also to secure a practically entire absorption of the waste heat products of combustion or waste steam by the entering air for combustion. It is also obvious that by a vertical elongation of the heat-absorbing cavities of the main apparatus the heat of the burned gases may be all practically absorbed into the water rising through the piping to a degree approximating the temperature of that of the feed-water introduced into the piping at the bottom of these cavities.

I especially call attention to the fact that in this apparatus, as in all of the apparatuses shown in accompanying drawings, I first apply the heated gaseous products of combustion to the highest levels of the heat-transmitting surfaces of the apparatus and then progressively bring these gases in contact with heat-transmitting surfaces of progressively-lower temperatures. In this method of applying heat to transmitting-surfaces I apply the highest degree of heat to the absorbing medium (air, water, or steam) of highest temperature, and thus secure a greater absorption of the heat than has previously been attained.

In other apparatuses of this nature previously used the heat has first been brought in contact with portions of the transmitting-surfaces below the highest level and then brought out at the lowest level of the heat-absorbing cavities, or else they have been brought in contact with the highest heat-transmitting surfaces, then carried down over heat-absorbing surfaces of a lesser degree of temperature, and then again up over heat-transmitting surfaces of a higher degree of temperature. In this latter case these gases instead of adding increased heat to the absorbing medium are likely to absorb heat from the medium. My method of applying the heated gases obviates such uneconomic methods.

It is understood that in these apparatuses when I say that I apply the heat to the highest transmitting-surfaces first I want it understood that in some constructions, as in the case of a round shell-boiler, such as is shown at B B B, it is practically impossible to make the first contact with absolutely the highest point; but this fact must not be allowed to interfere with the spirit of my invention. Wherever it is practical I make the first contact with absolutely the highest point. This is shown more particularly in Figs. 11 and 14.

In the more simple forms of my invention, especially those which are used in house-heating, I introduce air for combustion through a dependent conduit and introduce it into the combustion-chamber at a high level and utilize the natural chimney-draft instead of a mechanically-produced draft.

The object of introducing air for combustion at a high level in heating and power-producing apparatuses is to secure a complete admixture of such air with unconsumed gases, which have a tendency to rise to the highest levels of the cavities of the apparatuses and there form in a stratum of unconsumed gas at a somewhat lesser degree of temperature than that of gases that have undergone complete union and combustion. Furthermore, a high introduction of air, if at the level of the exit of the outgoing volatilized combustible gases from the combustion-chamber, meets the outgoing current of these gases and mixing with them secures their combustion before they leave the combustion-chamber and at a high point in the combustion-chamber. It will be understood that it is most desirable to have the highest degree of heat in the highest level of the combustion-chamber or heat-absorbing cavities of the heating apparatus. Another reason for the high introduction of air is that such parts of the air as escape combustion in the higher parts of the combustion-chamber in its gravitation downward to the fuel mass has the opportunity to become more thoroughly admixed and diffused with the rising volatilized gases.

It has been found in practice that it is desirable to supply air for combustion to a very large degree from the top of the fuel mass in order that the formation of smoke may be prevented and that there may be a more complete union of air for combustion with the carbon and hydrocarbon gases, and thus prevent the loss of fuel through the formation of and escape of carbon-monoxid gas, and also to prevent too great chilling of the fuel at the lower part of the fuel mass. It is practically impossible to pass sufficient air for combustion through the grate and fuel mass of a heating or power-producing apparatus to secure perfect combustion, and if all the air for combustion is introduced through the grate and through apertures in the feed-door of the apparatus the light volatilized gases are floated out in advance of the introduced air for combustion; but if the air is introduced from above the air is more thoroughly admixed and fused with the combustible gases and a more complete combustion produced. The introduction of air for combustion by means of forced jets or films into a partial vacuum induced in the combustion-chamber is for the purpose of securing a more thorough admixture, diffusion, and quicker distribution of the air for combustion with the volatilized combustible gases.

In my invention it will be seen that the air is so introduced in this way in order that the volatilized gases as they rise must necessarily be brought in very intimate relation with films or jets of air for combustion. In case of films these rising gases must necessarily pass through those films.

In high-pressure steam power-producing boilers of large capacity the control of the draft and the introduction of air through the action of mechanical means for producing draft such as I have described is an economical procedure, and the utilization of the heat of exhaust-steam and of the exhaust gaseous products of combustion for heating air for combustion by means of a heat-abstractor is also an economical procedure.

Referring now to the design of the boiler shown in Fig. 4, it is provided with a cast-iron base, which is bolted to the timbers of the vessel. It has an annular non-conducting wall W', (see Fig. 4,) surrounding the combustion-chamber C', and this is surrounded by vertically-placed shell boilers T T T of relatively small diameter and supplied with hand-holes T' at the top. These vertically-placed boilers are held in place at the top of the apparatus by a frame H. This frame has apertures in it through which the boiler-sections T T are dropped and held in place. These vertical boiler-sections communicate with the central steam-drum D by means of steam-pipes P and P'. In the frame H, underneath the steam-drum D, are air-cavities $A^2$, which are supplied from an externally-placed air-conduit A. The combustible gases rising through the tall vertical combustion-chamber strike the frame H underneath the drum D and measurably heat the air for combustion as it passes through the cavities in the frame. The air for combustion finds its exit into the upper part of the combustion-chamber through the orifices $A^3$, these orifices being so arranged as to spread out the air for combustion radially in jets. Air for combustion is also introduced below the grate. In the combustion-chamber of this apparatus a gravity magazine-feeder is introduced, the fuel for which is introduced through the front of the apparatus in the chute N. Air for combustion is introduced into the top of this feed-chute and is forced through the annular tube $A^4$, surrounding the magazine $M^2$. Surrounding this annular air-conductor is an annular non-conducting tube.

Referring now to the marine boiler shown in Figs. 8, 9, and 10, $C^2$ represents the combustion-chamber, and $O^5$ shows a heat-abstractor practically the same as is shown in Fig. 3 except that the heating-tubes $O^3$ have their openings in a closed case $O^6$, which communicates with the blower R' of an ordinary type, and the air for combustion is forced through the entire system instead of there being a partial induction of the air for combustion, as in the form shown in Fig. 3. In Fig. 10 is also shown a blower $Q^3$, inserted in the base of the smoke-stack for inducing a draft through the smoke-flues communicating with each section of the battery of boilers.

In Fig. 11 the hot-water boiler is composed of sections united one to the other, and each is composed of a substantially curved upper section and round dependent tubes inserted therein communicating with lateral water-conductors $W^2$. This form of apparatus has a wall of fire-brick $W^3$, capped with a tubing conduit of terra-cotta or other fire-resisting material, and these communicate with the depending conduits $O^7$ $O^7$, located at the front of the apparatus. These conduits have regulating-dampers $U^4$, which control the amount of air introduced into the upper part of the combustion-chamber $C^3$ through the capping-conduits W⁴, which distribute the air in films through slots in the capping of the top of the wall W³.

In the hot-air heating apparatus shown in Figs. 14 and 15 there is an annular fire-brick wall W⁵, dividing the combustion-chamber from the heating-cavity X, and this wall is surrounded by an annular air-conductor A⁴, which introduces the air for combustion into the upper part of the combustion-chamber in films or jets. In the interior of this combustion-chamber is also a gravity-feed magazine, substantially the same as that shown in Fig. 4 and hereinbefore described.

Fig. 15 represents a cross-section of the apparatus shown in Fig. 14 and shows a corrugated vertical transmitting-wall Y. This is fastened to a curved dome at the top of the apparatus and fits into a cast-iron base at a horizontal section just below the grate-line.

In the form of invention shown in Fig. 14 the air for combustion is introduced into the annular conduit A⁴ through a dependent air-conduit similar in construction and disposition to the dependent air-conduit O⁷. (Shown in Fig. 13.) In all the forms shown the principle is applied of air introduction through a vertical dependent air-conduit in which escape of combustible gases downwardly through the conduit is prevented by the upward pressure of the atmosphere acting in the conduit.

X' shows apertures by which the exhaust products of combustion are carried down into an annular cavity S⁴ (see Fig. 14) and out through the smoke-flue S.

Z represents apertures which admit air for heat distribution in various circumferential portions of the apparatus, the same being conveyed to the base of the apparatus through an ordinary cold-air duct X². In the working of this apparatus the air coming through the apertures Z Z and passing upwardly in contact with the corrugated transmitting-wall Y is heated progressively as it rises over the wall and is finally conveyed by proper conduits into various parts of the house to be heated.

In the stove shown in Figs. 16 and 17 the combustion-chamber and fire-pot C⁴ is surrounded by an annular non-conducting tube, and the air for combustion enters the combustion-chamber through a dependent conduit O⁸ of a restricted vertical length formed in one piece with the smoke-nozzle of the stove and having air-apertures A⁵ discharging air for combustion into the combustion-chamber at or near the point where the gases of combustion commence to follow down the space X³, and thus secure a proper admixture and diffusion of gas and air in the upper part of the apparatus. The air for combustion enters the dependent conduit O⁸ through an adjustable slide O⁹.

What I claim as new is—

1. In a heating or power-producing apparatus, the combination of a combustion-chamber having a high vertical run for the igneous union of air and combustible gases, heat-radiating surfaces constructed and disposed to radiate the lowest degree of heat of said surfaces from the lowest level of said surfaces and to radiate heat of progressively increasing temperatures from said surfaces at progressively-higher levels, means for passing a heat-absorbing medium over said surfaces in a current passing from below where the lowest temperature of said surfaces prevail progressively upward to the highest levels where the highest temperature of said surfaces prevail, gas retaining and traversing cavities and heat-transmitting surfaces constructed and disposed to avoid contact with unconsumed solid and gaseous fuel and to receive the first contact of the hottest gases generated in said apparatus at the highest levels of said cavities and transmitting-surfaces and to receive a further and progressive contact of said gases with said surfaces at progressively-lower levels in said cavities in horizontal strata of progressively decreasing temperatures, means for conveying gases between the highest levels of said chamber and said cavities, said chamber and said cavities being separated from each other except at their connection with said gas-conveying means, said combustion-chamber being provided with a heat non-conducting means interposed between the igneous fuel and unconsumed gases in said chamber and said cavities and transmitting-surfaces at levels below the level of said means for conveying gases, means for the exit of said gases from said apparatus at the lowest level of said cavities after said gases have once passed over said heat-transmitting surfaces, means for the introduction of air for combustion into said chamber at various levels above and below the fuel mass and comprising a conduit constructed and disposed to prevent downward emission of gaseous products of combustion therefrom against the force of atmospheric pressure, means for controlling the amount of air introduced at any said level, means for indicating the position and adjustment of said controlling means, and for holding the same in fixed positions, and means for varying the intensity of draft acting in said apparatus.

2. In a heating or power-producing apparatus the combination of a combustion-chamber constructed to secure the substantially complete admixture of the air needed for the combustion of and its chemical union with rising volatilized products of combustion generated in said chamber before said products make a first contact with any heat-transmitting surface of said apparatus, means for the forced introduction into said chamber of air in divided currents, means for maintaining in said chamber and in the gas-traversing cavities of said apparatus, a mechanically-induced partial vacuum, said means for introducing air comprising air-compressing means and an air-conduit having an air-aperture open to the atmosphere at a level sufficiently low in its relation to said apparatus to prevent the emission of products of combustion from said aperture against the pressure of the atmosphere acting upwardly in said air-conduit.

3. In a power-producing apparatus, the combination of means comprising a combustion-chamber having a high vertical run for the ascent of gases, said combustion-chamber being provided with means for keeping the heat of said gases in said combustion-chamber separated from all heat-absorbing surfaces of said apparatus until said gases are first brought into contact with the said absorbing-surfaces at the highest level of said absorbing-surfaces, means for securing a progressive further contact of said gases in horizontal stratas at progressively-lower levels and for their final exit at the lowest level of said heat-absorbing surfaces, a heat-abstracter constructed for the first reception therein in its upper levels of waste warm products such as vapor, steam and gases of combustion and for the horizontal stratification of said warm waste products and their descent in said abstracter to progressively-lower levels and for their final exit at the lowest level of said abstracter, and comprising vertical conduits for conveying air for combustion and passing entirely through the said waste warm products, said vertical conduits being separately and directly open to the atmosphere at their lower ends and disposed to prevent the emission from said lower ends of gaseous products of combustion against atmospheric pressure acting upwardly in said conduits, and means for inducing in said abstracter a mechanically-produced flow of air for combustion through said conduits from below upward and for inducing a mechanically-produced current of said waste products passing from above downward through said abstracter.

4. In a heating or power-producing apparatus, the combination of a combustion-chamber, means for introducing air for combustion in divided currents at any desired level in said combustion-chamber, means for producing and separately controlling the intensity of a forced draft and of an induced draft in said apparatus, said means comprising a blower provided with a fan and an elongated vertically-disposed shaft extending both upwardly and downwardly from said fan, said fan having a laterally-enlarged fan-box, said shaft having an elongated annular inclosing gas-conduit connecting above and below with said fan-box, said shaft having bearings at both the upper and lower ends, said shaft having attached thereto outside of the annular conduit means for revolving said fan, said annular conduit connecting with a flue for conducting hot gases at a point above said fan-box but at a point sufficiently below the upper end of said annular conduit to have said upper end contain a non-conducting body of gas for preventing overheating of the upper bearing, and means for controlling hot gases introduced and drawn out of said combustion-chamber.

5. In a heating or power-producing apparatus, the combination of a combustion-chamber comprising a vertically-elongated run for rising gases, means for introducing unvitiated air to the higher levels of said chamber, a vertically-elongated heating-cavity located adjacent to said chamber and comprising tubing in sections having internal heat-absorbing surfaces and external heat-radiating surfaces, said chamber and said cavity being open at their lowest levels to the influence of atmospheric pressure, said chamber and said cavity being constructed and disposed in relation to each other at levels to secure in both an equilibrious balance at the same level of the gaseous products of combustion generated in said chamber, and the retention in both, of said gaseous products through the upward action of atmospheric pressure in said chamber and said cavity, except as to an exit for waste gaseous products at the lowest level of said cavity, a gas-passage joining said chamber and said cavity at their highest levels, a non-conducting heat-refractory wall or partition interposed between and separating said chamber and said cavity at the levels in said apparatus below said gas-passage, an exit for waste gaseous products of combustion at the lowest level of said cavity, and means for passing a heat-absorbing medium progressively over said heat-radiating surfaces from the lowest level to the highest level of said surfaces.

6. In a high-pressure power-producing apparatus the combination of a combustion-chamber having a vertical elongated run for gas mixing and gas combustion, a heating-cavity located laterally to said chamber and comprising internal heat-absorbing surfaces and external heat-radiating surfaces, means for passing from below upward a heat-absorbing medium over and in contact with said radiating-surfaces, said combustion-chamber being provided with a non-conducting heat-refractory medium interposed between said chamber and said cavity, except at their highest level to prevent transmission of heat from the combustion-chamber except at the highest level of said chamber, means for the passage of hot gases between said chamber and said cavity at their highest level, a gravity-feed fuel-magazine comprising a non-conducting heat-refractory means interposed between the fuel in the magazine and the heat generated in said chamber for protecting the fuel from the heat, a shaking and fuel-moving grate, a heat-abstracter, conduits for introducing air for combustion into said apparatus at various levels, means for controlling the amounts of air supplied at the said levels, means for forcing a draft in said apparatus, and means for inducing a draft in said apparatus.

7. In a heating or power-producing apparatus, the combination of a combustion-chamber having a high vertical run, a heating-cavity located adjacent to said chamber and containing heat-absorbing surfaces and heat-radiating surfaces, said chamber being separated from said cavity except at the highest level of said chamber, an avenue of communication between said chamber and said cavity at said highest level, means for introducing unvitiated air for combustion to the upper levels of said chamber comprising an air-introducing dependent conduit, said chamber, cavity and air-introducing dependent conduit being disposed to retain in their several passages at the same level buoyant gases of equal specific gravity, a smoke-flue, a conduit leading from said heating-cavity to said smoke-flue at the lowest level of said heating-cavity, a conduit leading directly from the higher levels of said chamber to said smoke-flue, and means for controlling the passage of gaseous products of combustion through said highly-located exit-conduit.

8. In a heating or power-producing apparatus the combination of a combustion-chamber, the heat-absorbing surfaces of said apparatus, said chamber and surfaces providing means for the first contact of the hot products of combustion generated in said chamber with the heat-absorbing surfaces of said apparatus at the highest level of said surfaces and for preventing the transmission and conveyance from said chamber of the heat generated in said chamber to said absorbing-surfaces except at the highest level of said surfaces, and means for the introduction of unvitiated air for combustion into the gas-retaining and gas-traversing passages of said apparatus at the highest level of said passages and for preventing the emission of gaseous products of combustion from said air-introducing means against the action of atmospheric pressure.

9. In a heating or power-producing apparatus the combination of a magazine feeding fuel through the influence of the gravity of the fuel, said magazine comprising a non-conducting medium and a passage for passing an interposed current of air for combustion between the wall of said magazine and said non-conducting medium, said non-conducting medium interposed between the hot gases in the combustion-chamber and said current of air, and means for introducing said air for combustion into the combustion-chamber at or near the delivery-orifice of said magazine and for the deflection of said air over the fuel mass adjacent to said delivery-orifice and for preventing the directly-upward ascent of heated gases into the passage for passing said air for combustion.

10. In a heating or power-producing apparatus the combination of a combustion-chamber comprising a gas-mixing cavity disposed above the level of the fuel-feed door of said apparatus, the gas-retaining and gas-traversing heating-cavities of said apparatus, said cavities being open downwardly to the atmosphere at their lowest levels, but being impervious in their walls to the upward and lateral passage of gases, means for the introduction of fresh air for combustion in the highest levels of said cavities at about where the hot gaseous products of combustion pass out of said chamber and for the introduction of air into said chamber at other levels therein, means for controlling the amount of air introduced at any said level, means for indicating the amount of air thus introduced, means for maintaining at will a partial vacuum in said combustion-chamber, means comprising constricted orifices located in the wall or incasement of said chamber at the several said levels for compressing air for combustion and for its sudden expansion in said chamber and for its horizontal projection in divided currents at right angles to rising combustible gases generated in said chamber, said combustion-chamber comprising a non-conducting wall or incasement for preventing loss of heat in the rising gases in said chamber until they have risen to said highest level, and means for separately controlling the intensity of any draft acting in said apparatus.

11. In a heating or power-producing apparatus, the combination of a combustion-chamber, a heating-cavity adjacent said chamber, said chamber and said cavity comprising in their upper parts and located above the fuel-feed door of said apparatus, gas-retaining concavities opening downwardly to the atmosphere, but being impervious to the upward and lateral passage of gases through the incasement of said concavities, a dependent conduit for the conveyance of air for combustion into the high levels in the cavity of said combustion-chamber and at about where the gaseous products of combustion find their exit from said chamber, said dependent conduit being separate and apart from the smoke-flue of said apparatus and outside of said combustion-chamber, and being of such length and having its lower end open to the atmosphere outside of said apparatus and at a sufficiently low level to prevent the emission through said lower end of gaseous products of combustion against atmospheric pressure acting upwardly in said conduit, means for mixing the air conveyed by said conduit with the said gaseous products of combustion in divided currents, means for varying the quantity of air introduced in said high levels, means for introducing air at other levels through or above the fuel mass in said apparatus, and means for varying the amount of air introduced at said other levels.

12. In a heating or power-producing apparatus, a combustion-chamber, a heating-cavity comprising heat-absorbing and heat-radiating surfaces, said cavity being separate and apart from said combustion-chamber, said chamber being formed and disposed to secure a relatively complete union and combustion of gaseous inflammable fuel and air before said combined gases come in contact with the heat-absorbing surfaces of said apparatus, said combustion-chamber being provided with means for preventing the passage of heat between the combustion-chamber and heating-cavities of said apparatus except at the highest levels of said chamber and said cavities, means for the introduction of unvitiated air for combustion into the higher levels of said apparatus at about where the gaseous products of combustion leave the combustion-chamber and comprising a vertical conduit of a length to prevent the egress of the gaseous products of combustion from the lower end of said conduit by reason of atmospheric pressure acting upwardly therein, means for introducing air for combustion in various other parts of said apparatus, means for controlling the quantity of air introduced at any part of said apparatus, means for indicating the amount of air thus introduced, means for securing the first contact of the hottest gaseous products of combustion with the highest levels of the heat-absorbing surfaces of said apparatus and a progressive contact of said gases as they decrease in temperature with heat-absorbing surfaces of progressively-lower temperatures, means for the first contact of a current of a heat-absorbing medium with the heat-radiating surfaces of said apparatus of lowest temperature and for progressive contact of said medium with the heat-radiating surfaces of said apparatus of progressively-increasing temperatures, and means for the escape of said gases from the heating-cavities of said apparatus at a part where the lowest temperature of said radiating-surfaces prevail and without being again brought in contact with any radiating-surface of higher temperature.

13. In a heating or power-producing apparatus the combination of a combustion-chamber constructed to secure above the level of the fuel-feed door of said apparatus a high vertical run for the unobstructed rise of gases to the highest level of said chamber, the heating and gas-traversing passages of said apparatus, said chamber and said passages being constructed and disposed to retain within their cavities through atmospheric pressure upwardly-rising or upwardly-pressing gases, but having at a low level an exit for the downwardly escape of waste gaseous products of combustion, means for producing a mechanically-induced exhaust-draft at will in said chamber, means for compressing unvitiated air for combustion for use in said chamber, means comprising conduits for separately conveying said unvitiated compressed air from said air-compressing means into the highest level of said combustion-chamber and into other levels in said chamber and under the fire-grate of said apparatus, means for controlling and indicating the amount of air introduced at any said level, and means for securing the admission of said air into said combustion-chamber in divided currents horizontally projected and at right angles to the combustible gases rising in said apparatus and for securing the sudden expansion of said compressed air after said air is introduced into said chamber, said last-named means comprising contracted orifices at the junction of the said conduits with the periphery of said combustion-chamber.

14. In a heating or power-producing apparatus, the combination of a combustion-chamber, means for introducing air for combustion at various levels in said combustion-chamber and below the fuel mass of said apparatus, a heating-cavity, the walls of which cavity comprise heat absorbing or retaining surfaces in said cavity and radiating or conveying surfaces external to said cavity, means for dividing said chamber from said cavity at all points except at a point or points that will allow the hot gaseous products of combustion generated in said chamber to enter said cavity at the highest level of the heat-absorbing surfaces of said cavity, said parts being arranged for preventing the transmission of heat from said combustion-chamber to said cavity except at said highest level, and means for the further contact of the said gaseous products of combustion with the heat-absorbing surfaces of said cavity at progressively-lower levels and for their final exit from said cavity without being again brought in contact with heat-absorbing surfaces having a higher temperature than the temperature of the absorbing-surfaces at the point of final exit from said cavity of the said gaseous products of combustion.

15. The combination of a combustion-chamber having a high vertical run, means for introducing unvitiated air to the high levels of said chamber, a heating-cavity located laterally to said chamber, said chamber and said cavity being constructed for and being disposed at levels to retain in said chamber and in said cavity horizontal strata of heated gases of like density at the same level and to prevent the downwardly escape of gases from said chamber, from said air-introducing means, and said cavity against the force of atmospheric pressure acting upwardly in said chamber, said air-introducing means, and said cavity, an avenue of communication for gases between said chamber and said cavity, said parts comprising a non-conducting medium interposed between said chamber and said cavity at levels below the level of said avenue of communication for preventing transmission of heat from said chamber to said cavity at levels below said avenue, and an exit for waste gaseous products of combustion at the lowest level of said cavity.

16. The combination of a combustion-chamber, a heating-cavity located laterally to said chamber, an avenue of communication between the highest levels of said chamber and said cavity, said combustion-chamber being provided with a non-conducting heat-refractory medium interposed between said chamber and said cavity at levels below said avenue, an exit for waste gases at the lowest level of said cavity, means comprising a dependent air-conduit for conveying unvitiated fresh air for combustion into the highest levels of said chamber, and means for controlling the amount of air thus highly introduced.

17. In a heating or power-producing apparatus, the combination of a combustion-chamber, means for inducing and maintaining at will a mechanically-produced partial vacuum in said chamber, means for compressing air for use in said apparatus, means for introducing compressed air at any desired level in said chamber and said apparatus and for controlling the amount of air thus introduced, means for dividing into multiple currents the air introduced into said chamber, means for causing the penetration of the combustible gases generated in said chamber and for the sudden expansion of the air introduced in said chamber after its entrance to said chamber.

18. In a heating or power-producing apparatus, the combination of a combustion-chamber, a mechanical draft-inducer for producing a partial vacuum in said chamber, an air-compressor, a compressed-air conduit leading from said compressor to said chamber, and means comprising contracted orifices at the periphery of said chamber, for holding back compressed air in said conduit between said compressor and said orifices and for the penetration of the combustible gases generated in said chamber and tenuated by said draft-inducer by multiple currents of and for the sudden expansion of compressed air, after said compressed air has passed through said orifices into said combustion-chamber.

19. In a heating or power-producing apparatus, the combination of a combustion-chamber having an elongated vertical run, heating-cavities located laterally to said chamber, said parts comprising means for separating said chamber and said cavities except at a high level in said chamber, gas-traversing passages between said chamber and said cavities at said high level in said chamber, means comprising orifices in said apparatus at a level near the fuel mass for introducing air above the fuel mass in said chamber for combustion and for shielding said separating means from extreme degrees of heat, means for controlling the amount of air introduced through said orifices, means for introducing air at other levels in said apparatus and for controlling the air thus introduced, and exit-apertures for waste gases at the lowest level of said heating-cavities.

20. In combination with a heating or power-producing apparatus having a combustion-chamber, means for inducing a mechanically-produced partial vacuum in said chamber, means for introducing air into said combustion-chamber in currents so directed that the volatilized gaseous fuel rising from the solid fuel in said apparatus shall pass through said currents before making a first contact with the heat-absorbing surfaces of said apparatus, said means comprising orifices in the periphery of the said combustion-chamber at a level above the solid fuel mass in said apparatus, said apparatus being constructed to prevent air from securing contact with said volatilized gaseous fuel until said gaseous fuel has first passed to said directed currents, means for forcing said directed air-currents completely across the path of and for penetrating the said rising volatilized gases and means for securing the first contact of the heating-gases generated in said combustion-chamber with the highest level of the heat-absorbing surfaces of said apparatus and for a further progressive contact of said heating-gases with heat-absorbing surfaces of progressively-decreasing temperatures and for the final contact of said heating-gases with the heat-absorbing surfaces of said apparatus of the lowest temperature of any of the heat-absorbing surfaces of said apparatus.

21. In a heating or power-producing apparatus the combination of a combustion-chamber having a high vertically-disposed run, means for introducing and containing fuel at a low level in said apparatus, means for forcing air for combustion to said apparatus, means for supplying air to said fuel at and below the level of said fuel diffusedly and in forced divided currents, means for introducing air for combustion into said chamber through the circumferential walls of said chamber at any desired level of said chamber diffusively and in forced divided currents above the level of said fuel, and the heat-transmitting medium of said apparatus, said parts being provided with means for shielding said transmitting medium from the heat generated in said combustion-chamber, at all levels of said medium below the highest level of said medium until after said heat is first applied to said highest level.

In testimony whereof I have signed my name to this specification in the presence of two subscribing witnesses.

JOSEPH M. W. KITCHEN.

Witnesses:
E. N. ROBINSON,
R. H. E. STARR.